United States Patent [19]
Riley et al.

[11] Patent Number: 5,473,427
[45] Date of Patent: Dec. 5, 1995

[54] SPECTROPHOTOMETER

[75] Inventors: Roger J. Riley, Cambridge; Murray A. Creeke, Essex; Charles V. Perkins, Cambridge; Daran A. Sadler, Peterborough, all of England

[73] Assignee: Unicam Limited, Cambridge, England

[21] Appl. No.: 314,728

[22] Filed: Sep. 29, 1994

[30] Foreign Application Priority Data

Oct. 1, 1993 [GB] United Kingdom ............... 9320261

[51] Int. Cl.$^6$ ............................................. G01J 3/28
[52] U.S. Cl. ............................................. 356/328; 356/326
[58] Field of Search ............................. 356/326, 328, 356/329, 330–334

[56] References Cited

U.S. PATENT DOCUMENTS

| | | | |
|---|---|---|---|
| 3,163,698 | 12/1964 | Saunderson et al. | 356/329 |
| 4,669,880 | 6/1987 | Nelson et al. | 356/326 |
| 4,940,325 | 7/1990 | Becker-Ross et al. | 356/328 |

Primary Examiner—Vincent P. McGraw
Assistant Examiner—K. P. Hantis
Attorney, Agent, or Firm—Sughrue, Mion, Zinn, Macpeak & Seas

[57] ABSTRACT

A spectrophotometer using a charge coupled device array as an image receiver characterised in that an image of its entrance slit is tilted with respect to columns of pixels in the charge coupled device array and in which the height of the image of the entrance slit on the charge coupled device array is arranged to extend over two or more rows of pixels so that the image of the entrance slit is skewed over pixels in two adjacent columns. Means are provided to analyse the output of the pixels to provide information on the intensity distribution of each spectral line with respect to wavelength having a resolution greater than that of the pitch of the pixels in each row of the charge coupled device array. Preferably, the pixels of the charge coupled device array are arranged in perpendicular columns and rows and the image of the entrance slit is tilted with respect to columns of the charge coupled device array so that the rows of pixels on the charge coupled device array are generally aligned with the dispersion direction of the or each spectral order.

12 Claims, 7 Drawing Sheets

ROW 1

ROW 2

ROW 3

ROW 4

SPECTROPHOTOMETER

BACKGROUND OF THE INVENTION

There is a move to the use of charge coupled device arrays as the image receivers in spectrophotometers. Such charge coupled device arrays can replace single photodiodes, linear photodiode arrays and photomultiplier tubes. There is a potential advantage in using charge coupled device arrays because they can capture information on more than one spectral line simultaneously which is very useful when performing multi-element analysis using techniques such as inductively coupled plasma emission spectroscopy for the detection of metals in solution. Instruments using charge coupled device arrays are potentially very much faster for multi-element analysis since the information on all of the elements or species is captured simultaneously. As it is possible to capture information on more than one spectral line simultaneously more reliable comparative results can be obtained since all the elements being analysed and compared are analysed at the same time from exactly the same sample. When using a single detector as the image receiving element there is inevitably a time lag between the detection of the different species which involves a lack of certainty over whether the sample and the operating conditions are uniform over a period of time.

It is often desirable to monitor the intensity profile of a particular spectral line, especially when developing an analysis method, to examine the spectral line for line overlaps and hence interferences on the analytical measurements between a line distinctive of one element and interfering line from another element.

In the past when using a photomultiplier tube, for example, it is common to provide an exit slit which is matched to that of the entrance slit to isolate light from a single spectral line. To obtain information on the intensity profile of a spectral line, what has been done previously is to step the exit slit across the spectral line in, for example, steps of a tenth of the width of the exit slit. By subsequently analysing the results obtained at each step it is possible to produce a plot of intensity against wavelength and by examining the shape of this plot it is possible to determine whether the spectral line is "clean" or whether it includes shoulders or dips indicating the presence of light from an interfering species.

When using a charge coupled device array it would be desirable to have a charge coupled device array of sufficiently high resolution that each spectral line was spread over many pixels in the wavelength direction. In this way, the output of each pixel would correspond to each step of the conventional scan in the wavelength direction and would again enable an intensity profile of the spectral line to be determined. However, charge coupled device arrays of sufficient size and pixel density are not normally available and would, in any event, be prohibitively expensive. Charge coupled device arrays in which the pixel size corresponds to the full height half width of a spectral line and of a size so that the entire spectrum of a spectrometer can be imaged on it are much more reasonably priced. Accordingly, what has been proposed at present with such devices is to scan the charge coupled device array with respect to the spectral lines so that, for example, the spectral line is moved in the wavelength direction with respect to the charge coupled device array in steps of a tenth of the pixel width or spectral line full height half width. Thus, this is exactly analogous to the conventional relative movement of the exit slit and spectral line to be able to get an output giving information on the intensity of the spectral line with respect to wavelength.

This technique, however, has many of the disadvantages of a conventional instrument using only a single detector. Mechanical means to provide the relative movement between the spectral line and the charge coupled device array must be provided and their movement controlled and monitored accurately. It is not possible to carry out the monitoring of all spectral line profiles simultaneously in a single step because, inevitably, there is a time lag between each measurement position as the relative movement between the charge coupled device array and the spectral line occurs. Changes in sample concentrations or operating parameters during this period naturally affect the result and lead to the generation of false intensity distribution profiles. Whilst the use of a charge coupled device array is faster than the use of a single detector because it is possible to monitor several different lines simultaneously it is still not as fast as is potentially possible because it is still necessary to carry out a number of different reads of the charge coupled device array as it is scanned with respect to the spectral line for each sample to be analysed.

DESCRIPTION OF THE INVENTION

According to this invention, a spectrophotometer using a charge coupled device array as an image receiver has the image of its entrance slit tilted with respect to the columns of pixels in the charge coupled device array and has the height of the image of the entrance slit on the charge coupled device array arranged to extend over two or more rows of pixels so that the image of the entrance slit is skewed over pixels in two adjacent columns, and includes means to analyse the output of the pixels to provide information on the intensity distribution of each spectral line with respect to wavelength having a resolution greater than that of the pitch of the pixels in each row of the charge coupled device array.

The optical system of the spectrophotometer may be arranged to provide the tilt between the image of the entrance slit and the columns of the charge coupled device array. It would also be possible to design an individual charge coupled device array in which the pixels are arranged in columns and rows which are not perpendicular to one another and so provide the tilt between the image of the entrance slit and the columns of pixels by tilting the columns of pixels relative to their rows.

However, it is cheaper to use conventional charge coupled device arrays in which the pixels are arranged in perpendicular columns and rows. Preferably it is the entrance slit which is tilted with respect to the optical path of the spectrophotometer rather than the charge coupled device array. In this way, the rows of pixels on the charge coupled device array are generally aligned with the dispersion direction of the or each spectral order whilst the image of the entrance slit is tilted with respect to columns of the charge coupled device array.

The spectrophotometer may be an absorption or an emission instrument and may be one which provides dispersion in only a single direction. An example of such a spectrophotometer is a UV-visible absorption instrument which, conventionally, uses a linear diode array but which in accordance with an example of this invention is modified to include a charge coupled device array and means to analyse the output of the pixels and so provide a greater resolution than is possible using a conventional linear diode array.

Preferably, however, the spectrophotometer is one which provides dispersion in two mutually perpendicular directions. In this case it is conventional to use a grating to disperse each order in a first direction which, for example, corresponds to the row direction of the charge coupled device array and then provide dispersion of the different orders in a perpendicular direction, corresponding to the column direction of the charge coupled device array. An example of such a spectrophotometer is one which includes an echelle polychromator.

In general, the greater the number of rows over which the image of the entrance slit is spread, the greater the resolution of the information on the intensity distribution with respect to wavelength. Practically, however, sufficient resolution can be obtained when the image is spread over four or five rows of pixels. The image of the entrance slit is generally matched to the width of the pixels in the row direction. Preferably the image of the entrance slit is tilted so that there is only one pixel width difference between the row position of the top and bottom.

With a spectrophotometer in accordance with this invention it is possible to collect data on the entire spectral output of the spectrophotometer in a single read of the charge coupled device array. The data can be analysed subsequently to compare the intensity of different lines within the spectral output and, for example, to monitor the intensity distribution of each line of interest to determine its intensity profile. By collecting the data on the entire spectrum at the same time, the results are unaffected by any variations in the sample over time and the invention also provides a very much greater throughput of samples in an operating time period.

As an illustration of how the present invention enhances the resolution of the intensity distribution with respect to wavelength consider FIGS. 1A, 1B and 1C which are diagrams illustrating the effect of tilting the spectral line image 1 with respect to a charge coupled device array 2. In FIG. 1A the entrance slit image 1 is illustrated as extending in the column direction over four rows of pixels, and being tilted so as to impinge upon pixels in two adjacent columns. The pixels are individually numbered (1) to (8). For the purposes of this illustrations assume that the intensity of the image of the entrance slit is constant in the column direction. The spectral line to be observed has a typical Gaussian intensity distribution in wavelength direction, i.e. in the direction of the rows, as illustrated at the top of FIG. 1A.

As a result of the tilt between the image of the entrance slit 1 and the columns of pixels, by reading the output of the pixels in the order in which they are numbered, in effect, a scan is carried out in the wavelength direction which is equivalent to moving a single photodetector eight steps in the wavelength direction as illustrated diagrammatically in FIG. 1B. The position of the image of the entrance slit 1 with respect to the individual pixels is shown and numbered in FIG. 1B in correspondence with the numbering of the pixels. Thus, the intensity information derived from pixel number (1) corresponds to the intensity information derived from the left hand side of the spectral line. The information from pixels numbered (4) and (5) correspond to the intensity information of the centre of the spectral line and the information from pixel number (8) corresponds to the intensity information from the right hand side of the spectral line. By monitoring the outputs of the pixels numbered (1) to (8) and then plotting a graph of intensity against wavelength an intensity plot as shown in FIG. 1C is produced where as shown in FIG. 1C a typical Gaussian profile results.

In its most elementary form the analysis of the output of the pixels to obtain the intensity distribution with respect to the wavelength of the spectral line may amount to reading the pixels upon which light of a particular spectral line of interest falls in a particular order, thereby to obtain intensity information equivalent to carrying out a scan across the spectral line of interest.

In reality, of course, as a result of aberrations in the optical system the intensity of the image of the entrance slit is not uniform and may be slightly curved. There is also a random registration of the image with the columns of pixels and, again as a result of aberrations may be some change in the angle of tilt over the entire spectrum. Thus light from one spectral line may extend over more than two columns of adjacent pixels even if the image of the entrance slit is tilted to provide a mean tilt of only one pixel width along its height direction.

It is therefore very much preferred that the means to analyse the output of the pixels monitors the output of the pixels in each row to provide coarse resolution intensity distribution information with respect to wavelength, interpolates this coarse intensity distribution information, and translates the information to compensate for the tilt of the image of the entrance slit, and then sums the translated interpolated information at a number of sampling points having a greater resolution than that of the pitch of the pixels in their rows.

The interpolation which is carried out may be a zeroth order interpolation in which a constant value output by each pixel is used at all sampling positions throughout the "width" of that pixel. Preferably, however, a first or higher order interpolation is carried out on the value output from each pixel. Thus, using, for example, a first order interpolation in which a linear interpolation is carried out between the pixel values, the particular intensity value at each sampling point is derived by linear interpolation from the values of adjacent pixels and then these are summed for each row at the same sampling point to provide an output for that sampling point. With higher order interpolations instead of, effectively, drawing a simple straight line between the output values of adjacent pixels a curve such as a quadratic or cubic-law curve is drawn between these output values and the sum is taken from where the quadratic or cubic curve crosses the sampling point.

Another method is to use a reconstruction algorithm which may be applied to the detected intensity values to obtain intensity profile information for each individual spectral line with respect to wavelength. One way in which this can be achieved is by storing the output intensity value of each charge coupled device array pixel in each column of the charge coupled device array in the form of a data table; expanding the number of data points in the table by repeating each consecutive charge coupled device array output value within a column of the table c.m/n times where m is the height of the slit image in terms of the number of charge coupled device array pixels, n is the line tilt of the slit image in terms of the number of charge coupled device array pixels, and c is the positive real number; displacing each column one data point relative to the adjacent column to compensate for the original image tilt; summing the values in each row of the data table; and, normalising the sum values. The normalised values can again be plotted to provide an intensity distribution profile.

It is possible to combine the present invention with the prior art arrangement where the charge coupled device is moved relative to the images of the entrance slits by, for example arranging for the charge coupled device to be moved relative to the spectral lines in the row direction. This arrangement would further enhance the resolution. In practice it may be necessary only to move the charge coupled device a distance of half of the pitch of the pixels. In this case only a single relative movement step is required and only two reads of the charge coupled device.

BRIEF DESCRIPTION OF THE DRAWINGS

The present invention will now be further described with reference to the accompanying drawings in which:

FIG. 2 shows an optical system of a typical spectrophotometer. The emission from a spectral source (not shown) is coupled to the entrance slit 4 of an echelle polychromator forming optical system 3 of the spectrophotometer. Typically the spectral sources are plasma or arc sources.

Figure 1A:
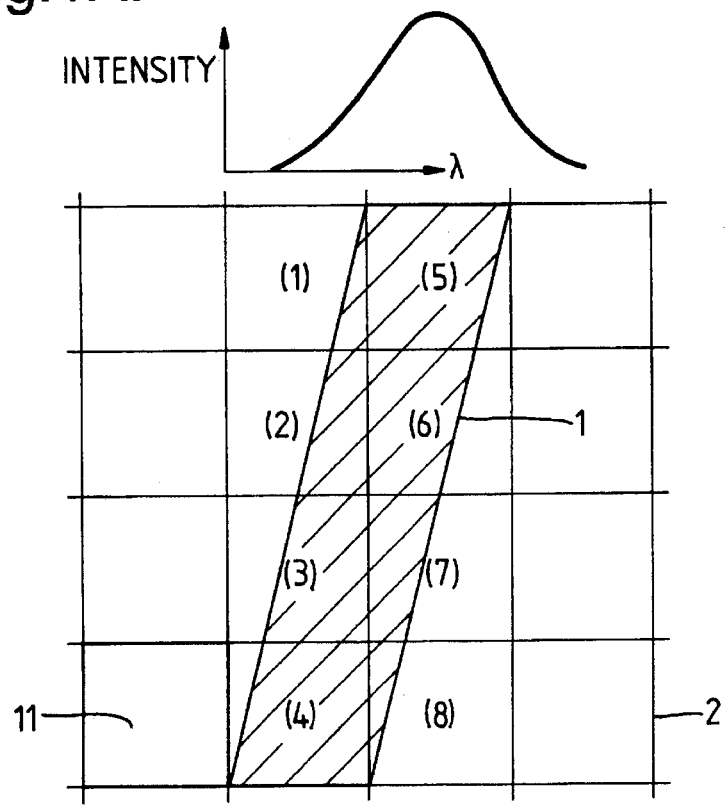
FIGS. 1A, 1B and 1C are diagrams illustrating the effect of the present invention.

The optical system comprises an entrance slit 4, typically 200 μm high and 50 μm wide, a collimator 5, an echelle grating 6, a prism 7, a focusing mirror 8 and a charge coupled device detector array 10.

Figure 3:
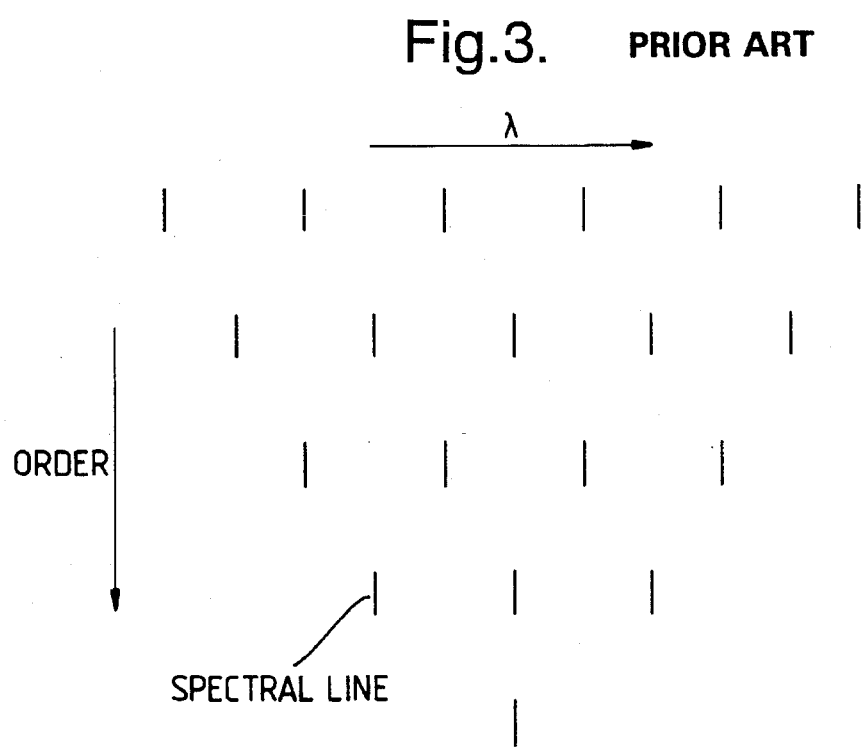
FIG. 3 shows the resolving by wavelength and order of emission spectra.
Figure 2:
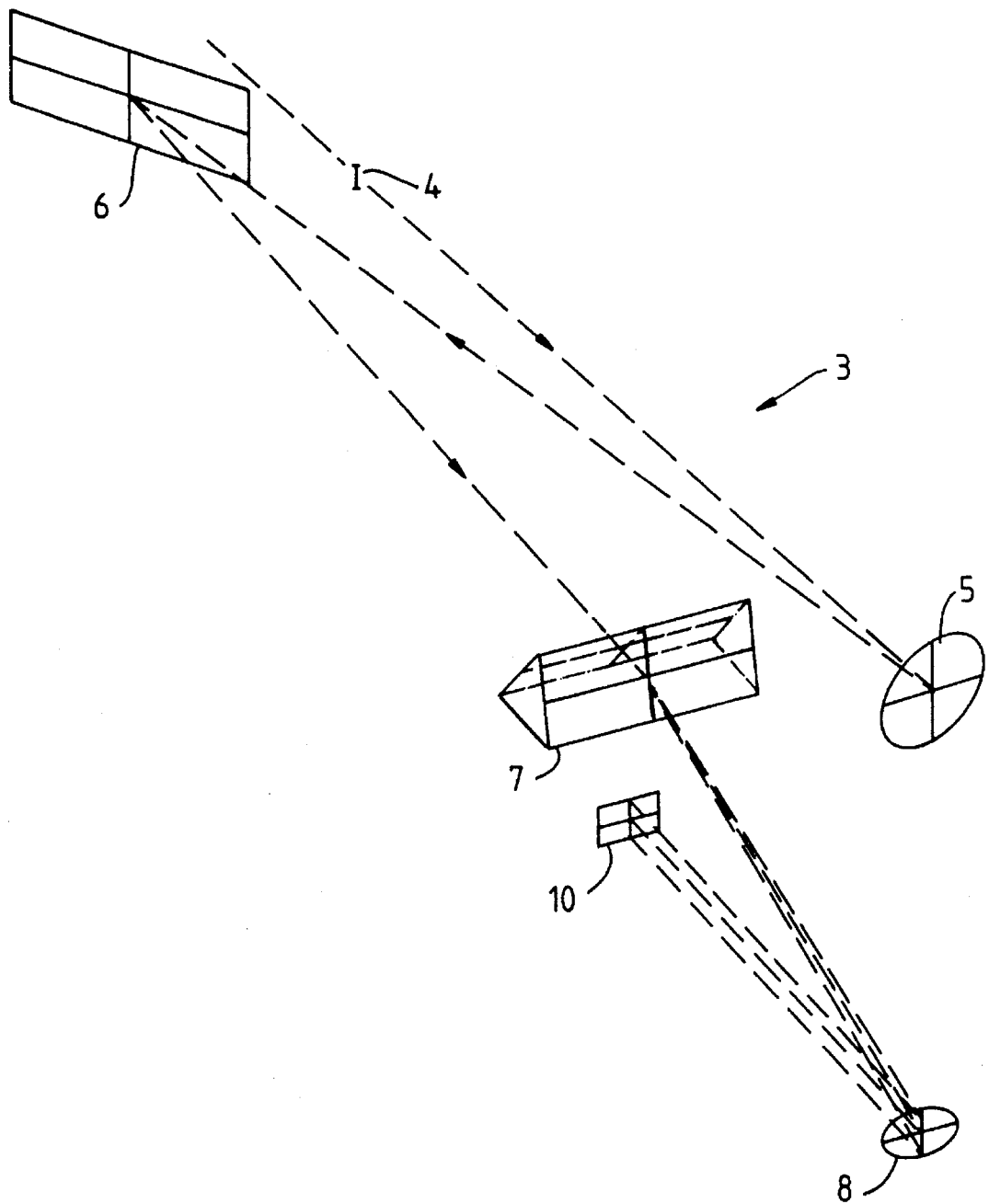
FIG. 2 shows a conventional spectrophotometer optical arrangement for detecting spectral lines.

The echelle grating 6 resolves emission spectra by spreading the spectra according to wavelength in one direction whilst the prism 7 resolves the orders of the spectra by spreading the orders in an orthogonal direction to produce several rows of spectral lines. This is illustrated in FIG. 3.

Figure 1B:
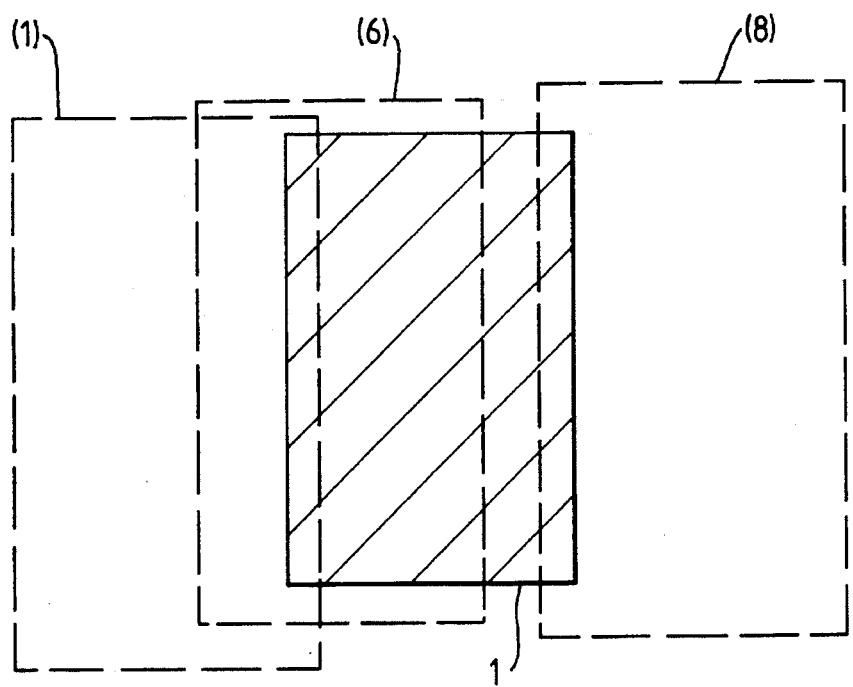
Figure 1C:
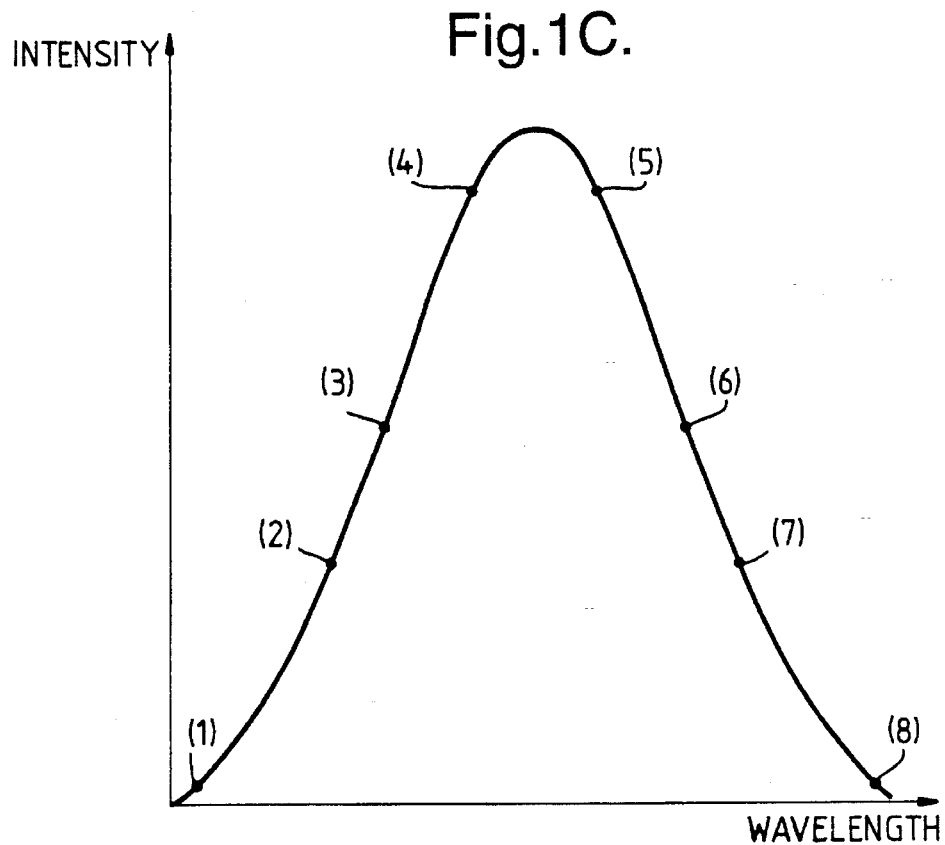

FIG. 1 illustrates how, in the present invention, the slit image 1 is tilted relative to the charge coupled device array 2 by one pixel 11. The slit image 1 falls across two columns of pixels of the charge coupled device array 2, each pixel detecting a different intensity value. In practice, the slit image 1 is not the regular shape depicted in FIG. 1 due to aberrations caused by the optical system.

Figure 4:
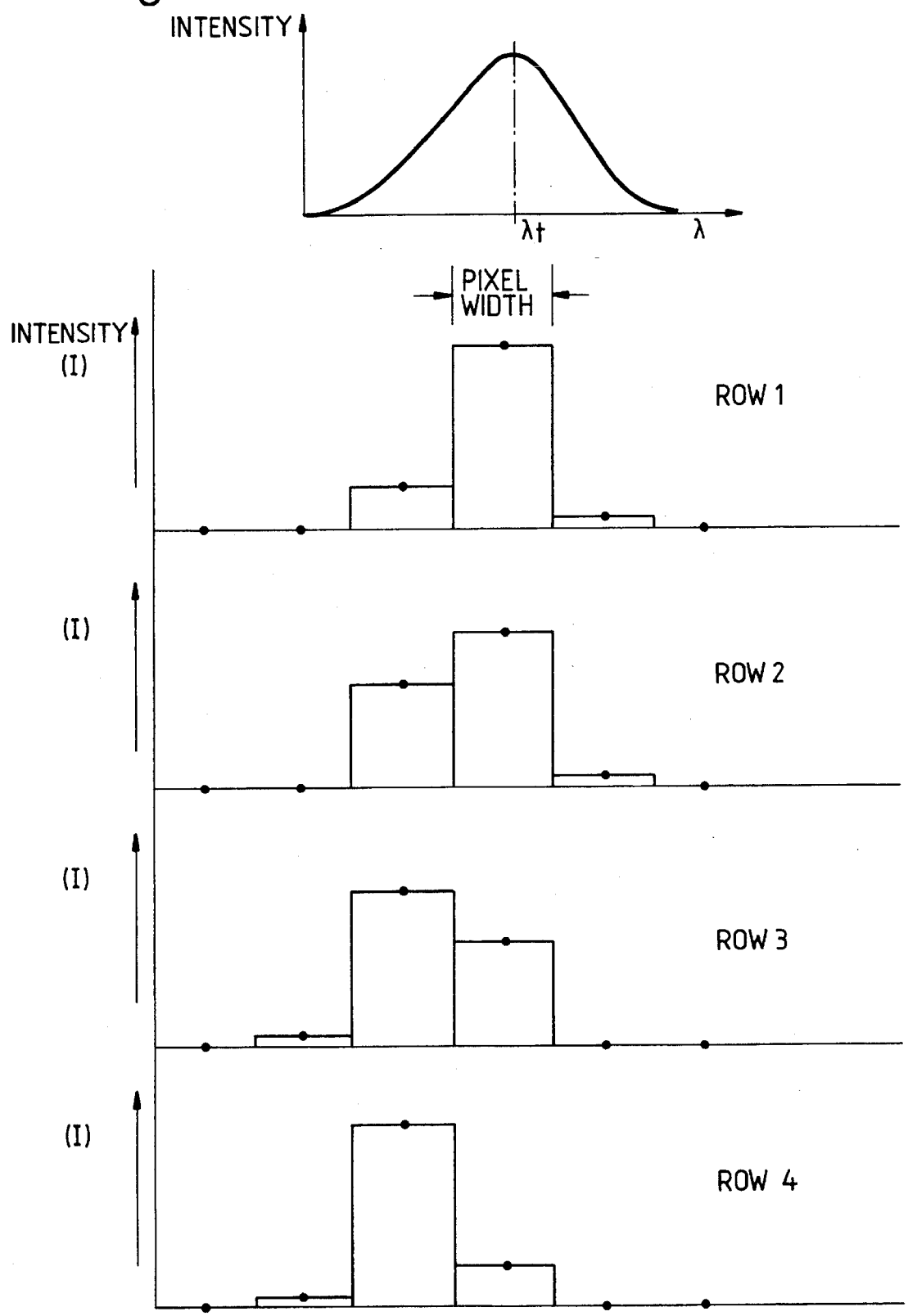
FIG. 4 shows the detected intensity output from each pixel within a charge coupled device array for a spectral line having a Gaussian profile.

FIG. 4 shows the detected intensity output values in bar graph form of a 6×4 charged coupled array for a spectral line having a Gaussian profile, in which the top of the exit slit is tilted by the width of one pixel with respect to the base of the exit slit.

The line profile reconstruction procedure involves two separate processes:

(i) a co-ordinate transformation to account for the original exit slit tilt, and, (ii) profile reconstruction to account for non-uniformity in the illumination of the slit image.

Each row of the array contains a coarse line profile which is different from that of the adjacent rows due to the tilt of the slit image across the columns and non-uniformity of the image illumination.

Figure 5:
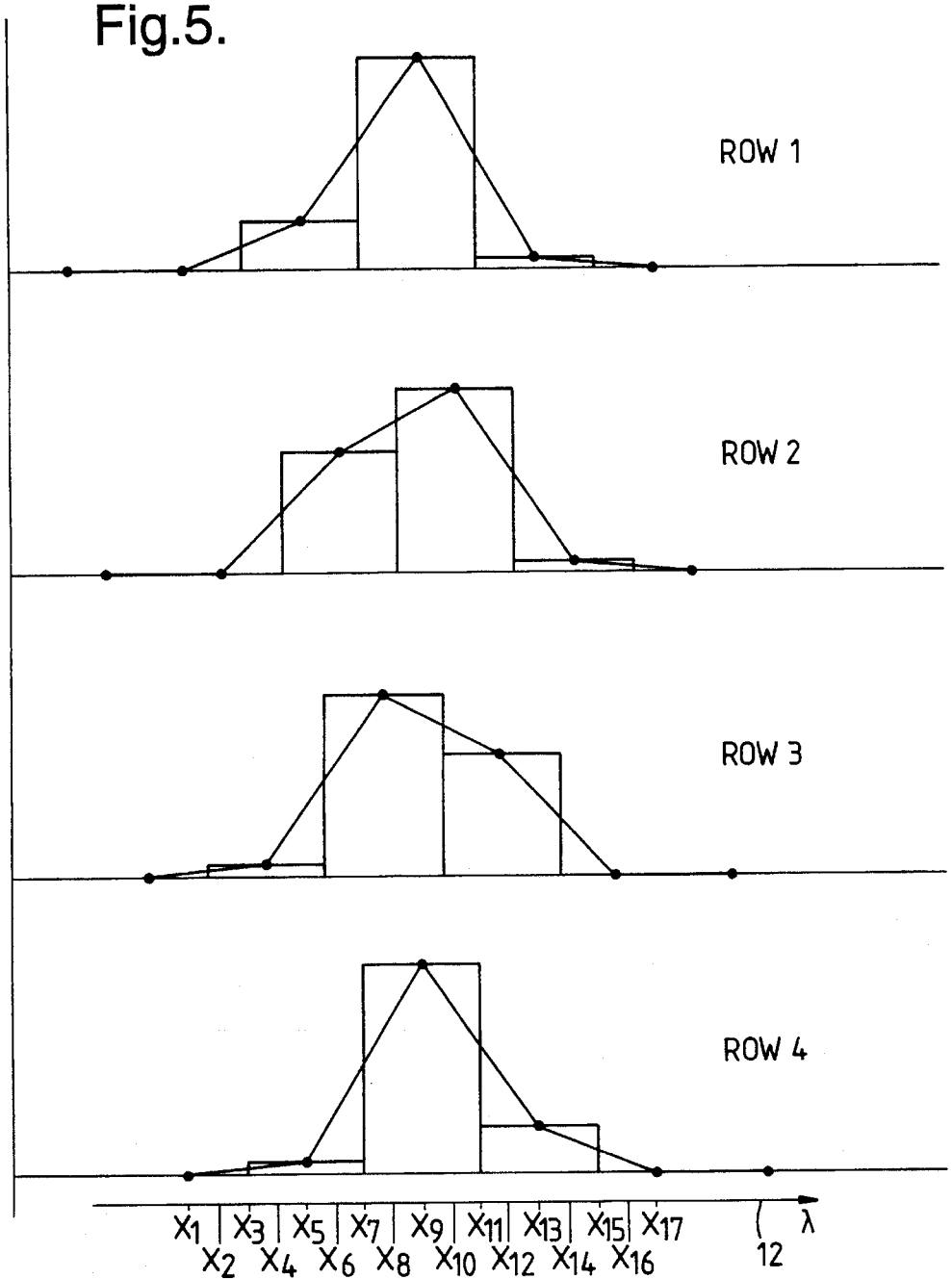
FIG. 5 shows a first example of a spectral line reconstruction procedure.

FIG. 5 illustrates one example of a spectral line reconstruction procedure. Intensity values in Row 1 of the array are fixed relative to a calibrated wavelength scale 12 and the detected intensity values in each subsequent row is translated to the right to reverse the effect of the original image tilt and so straighten the image.

Given that the overall tilt in this example is one pixel in four i.e. 14°, Row 2 is translated a distance equal to one third of a pixel width to the right, Row 3 is translated two thirds of a pixel width and Row 4 is translated by a complete pixel. The translation for each row can be calculated automatically for any number of rows given that the original tilt angle is known. Experimental results suggest a tilt of one pixel is ideal.

Next, to compensate for non-uniform illumination it is necessary to calculate for each row, the contribution to the final line profile. This is achieved by interpolating between adjacent measured data points along each row using a suitable interpolation function and summing together the contribution from each row. Essentially, an intensity contribution at a sampling point x is calculated for each row by polynomial interpolation and the contributions at point x for all the rows are summed together. Then, the point x is incremented by some interval Δx and the interpolation and summing procedure is repeated until the end of the data is reached. This provides information on intensity distribution for each spectral line with respect to wavelength, having a resolution greater than that of the pitch of the pixels in each row of the charge coupled device array.

Figure 6:
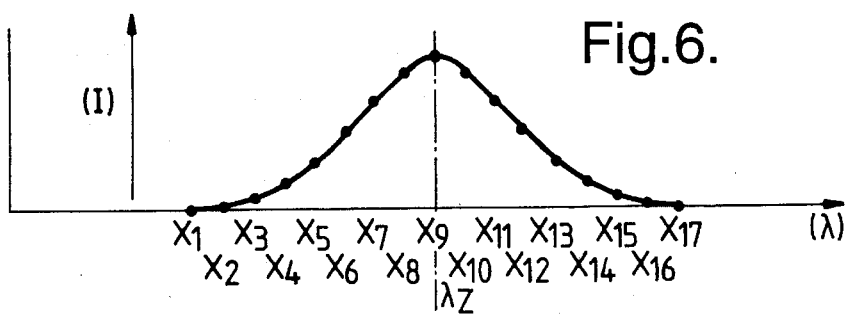
FIG. 6 shows the reconstructed profile of the spectral line of FIG. 4.

In the example shown in FIG. 5, a linear or piecewise interpolation is used in which effectively a straight line is drawn between adjacent intensity values in each row. Commencing at sample point $x_1$, the intensity contribution for each row is calculated, summed and subsequently stored. The sampling interval in this case is set at one quarter of a pixel and subsequent data is calculated for sample points $x_2$ to $x_{17}$ across the spectral line with respect to wavelength. The interpolated and summed results are shown in Table 1. The intensity profile may then be plotted. This is shown in FIG. 6. This Gaussian profile corresponds to that of the original spectral line of interest shown in FIG. 5.

Any polynomial interpolation function is suitable for the reconstruction procedure but clearly a higher order polynomial will require greater computational power and data handling facilities.

The following example illustrates a reconstruction algorithm which equates to a zero order interpolation procedure.

TABLE 1

| SAMPLE NO. | ROW NO. | | | | |
|---|---|---|---|---|---|
| | 4 | 3 | 2 | 1 | Σ |
| $X_1$ | 0 | 1 | 0 | 0 | 1 |
| $X_2$ | 1 | 1 | 0 | 2 | 4 |
| $X_3$ | 0 | 1½ | 3½ | 4 | 10 |
| $X_4$ | 1½ | 4 | 8½ | 6 | 20 |
| $X_5$ | 2 | 11 | 13½ | 8 | 34.5 |
| $X_6$ | 10 | 18 | 18 | 4 | 60 |
| $X_7$ | 18½ | 25 | 22 | 21 | 86.5 |
| $X_8$ | 26 | 29 | 24 | 26 | 105 |
| $X_9$ | 35 | 27 | 27 | 35 | 124 |
| $X_{10}$ | 28 | 24 | 28 | 28 | 108 |

TABLE 1-continued

| SAMPLE NO. | ROW NO. 4 | 3 | 2 | 1 | Σ |
|---|---|---|---|---|---|
| $X_{11}$ | 22 | 22 | 25 | 18 | 87 |
| $X_{12}$ | 15 | 19 | 18 | 11 | 63 |
| $X_{13}$ | 8 | 14 | 11 | 2 | 35 |
| $X_{14}$ | 6 | 8 | 4 | 2 | 20 |
| $X_{15}$ | 4 | 4 | 2 | 1 | 11 |
| $X_{16}$ | 2 | 0 | 2 | 1 | 5 |
| $X_{17}$ | 0 | 0 | 1 | 0 | 1 |

Figure 7:
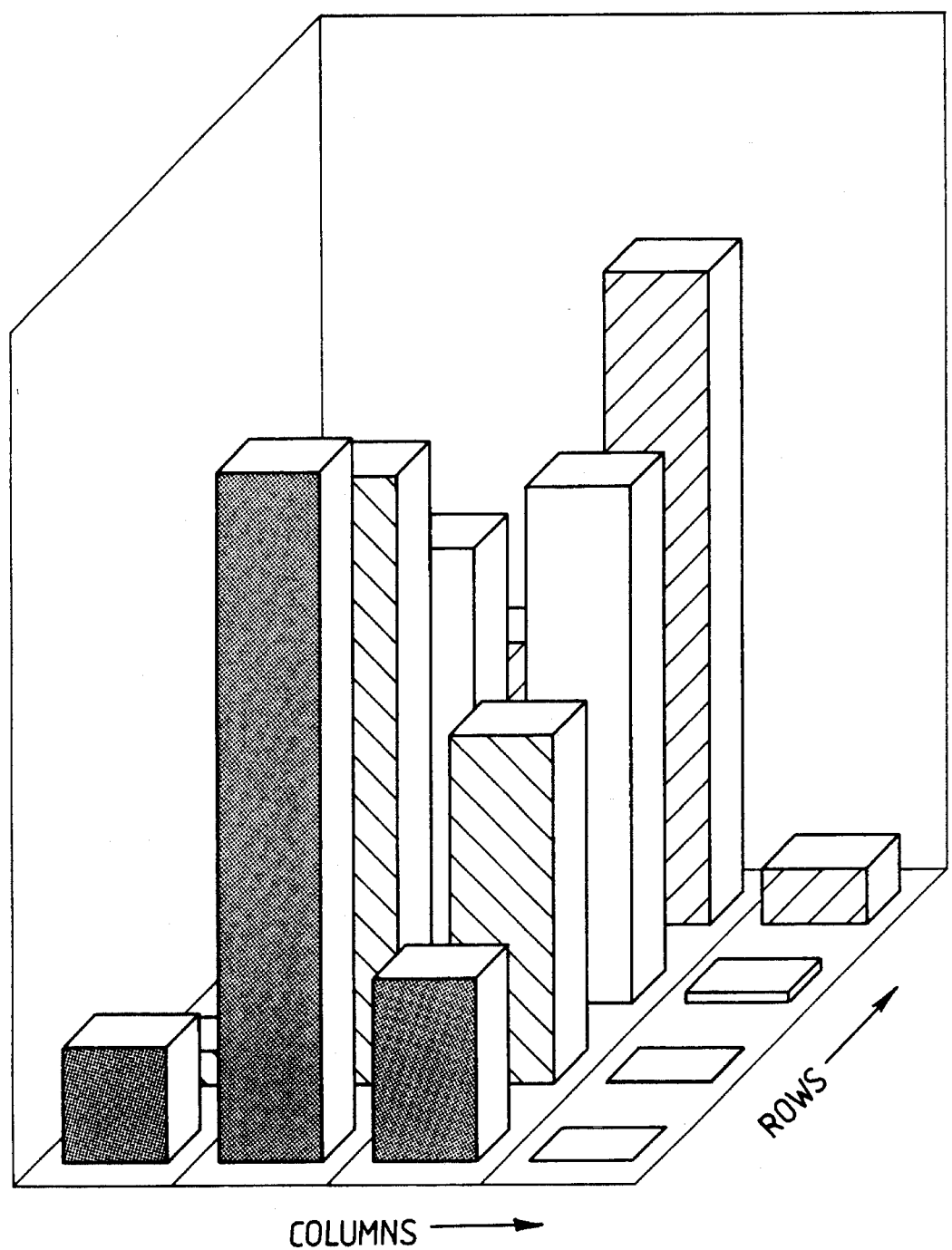
FIG. 7 shows another example of the detected intensity output from each pixel within a charge coupled device array for a spectral line having a Gaussian profile.

Table 2 shows the detected output from a charge coupled device array in which the geometric image of the entrance slit is 1.3 pixels wide and the line tilt is one pixel. The output from each pixel is illustrated graphically in FIG. 7.

At this stage, the raw data is then subjected to numerical analysis in the form of a reconstruction algorithm as follows.

Let the line tilt from top to bottom of the geometric slit image be n pixels and the height be m pixels. The array of data in Table 2 which represents a column of pixels is expanded to have each pixel value repeated m/n times. In this case m=4 and n=1 and therefore each pixel value is repeated four times. For non-integer values of m the values have to be repeated m/n×C times where C is chosen to make the results an integer. Each adjacent column is treated similarly. The columns are then shifted so that the data corresponding to the charge coupled device array rows are re-aligned as if the slit image were upright relative to the charge coupled device array. The top column is shifted by m data points, the next pixel down by m-1 points, and so on.

Figure 8:
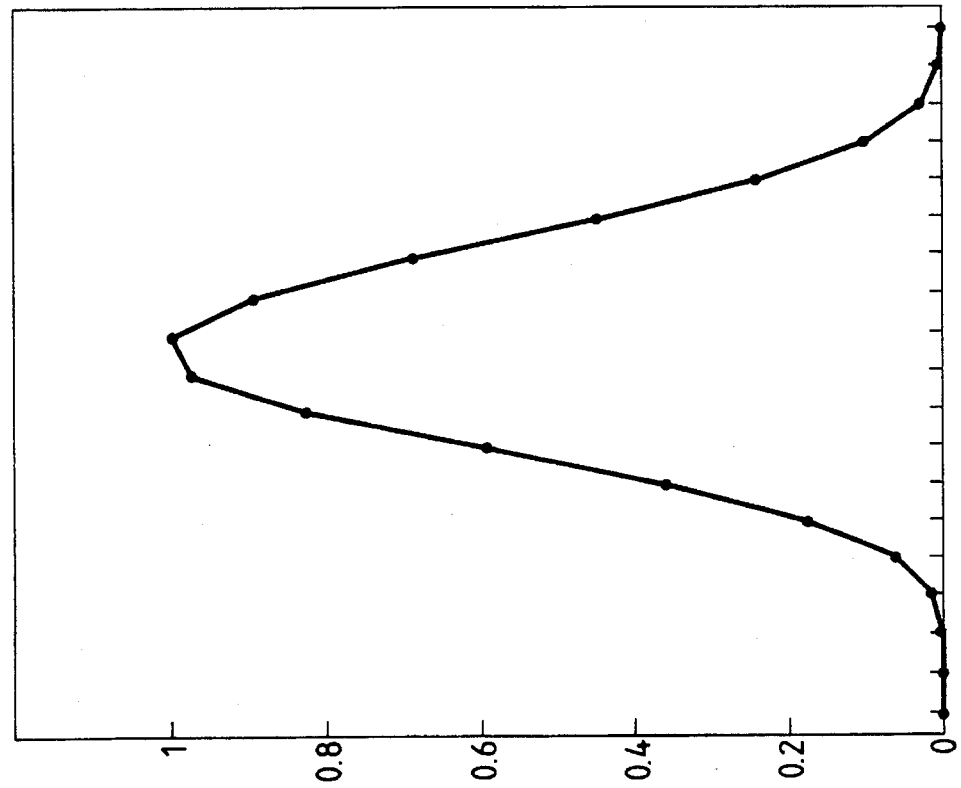
FIG. 8 shows the reconstructed profile of a single spectral line using a second example of a spectral line reconstruction procedure; and, FIG. 9 shows the reconstructed profile of two spectral lines using the second example of a spectral line reconstruction procedure.

This results in an enlarged table of results shown in Table 3. Each row of pixel values is then summed and the result normalised. The results are then plotted to obtain intensity profile information in the form of the graph shown in FIG. 8.

Figure 9:
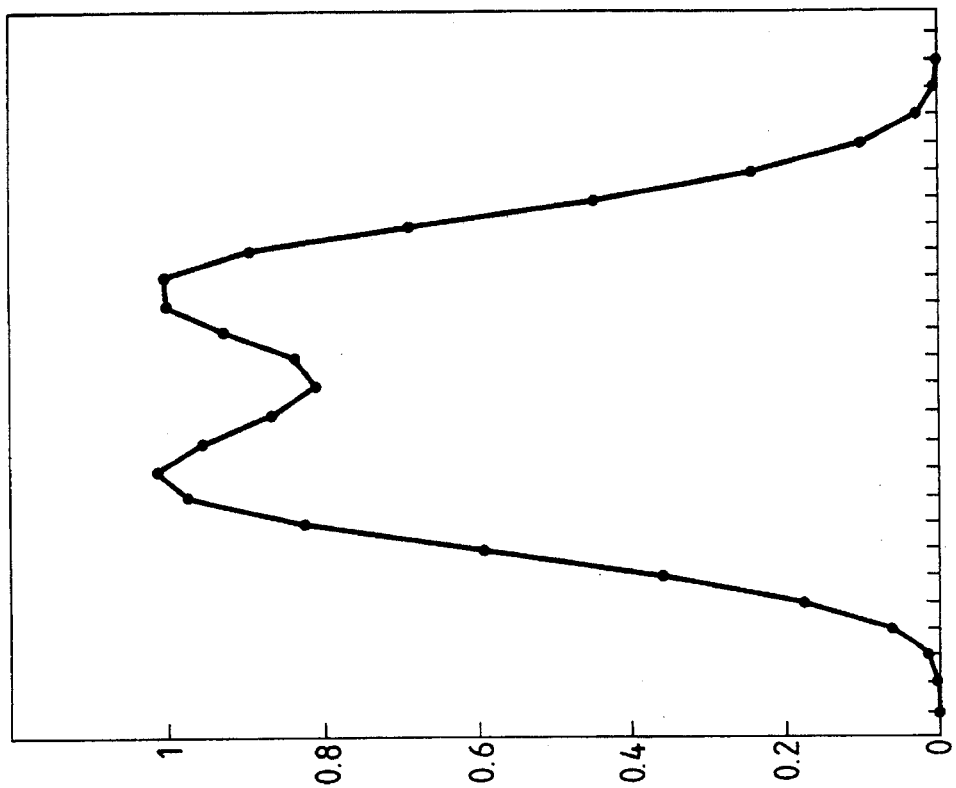

Another reconstructed intensity profile for two interfering spectral lines is shown in FIG. 9. This demonstrates the resolution of the reconstruction algorithm. The user can instantly recognise the overlapping

TABLE 2

| 0 | 0 | 0 | 0 |
|---|---|---|---|
| 41.32 | 11.603 | 1.73 | 0.107 |
| 242.578 | 214.217 | 160.672 | 99.895 |
| 64.831 | 122.568 | 182.488 | 228.795 |
| 0.007 | 0.348 | 3.846 | 19.939 |
| 0 | 0 | 0 | 0 |

TABLE 3

|   |   |   |   | SUM | NORMALISED VALUES |
|---|---|---|---|---|---|
|   |   |   | 0 | 0 | 0 |
|   |   | 0 | 0 | 0 | 0 |
|   | 0 | 0 | 0 | 0 | 0 |
| 0 | 0 | 0 | 0.107 | 0.107 | 0.000123 |
| 0 | 0 | 1.73 | 0.107 | 1.837 | 0.002116 |
| 0 | 11.603 | 1.73 | 0.107 | 13.44 | 0.015482 |
| 41.32 | 11.603 | 1.73 | 0.107 | 54.76 | 0.063082 |
| 41.32 | 11.603 | 1.73 | 99.895 | 154.548 | 0.178035 |
| 41.32 | 11.603 | 160.672 | 99.895 | 313.49 | 0.361131 |
| 41.32 | 214.217 | 160.672 | 99.895 | 516.104 | 0.594536 |
| 242.578 | 214.217 | 160.672 | 99.895 | 717.362 | 0.82638 |
| 242.578 | 214.217 | 160.672 | 228.795 | 846.262 | 0.974869 |
| 242.578 | 214.217 | 182.488 | 228.795 | 868.078 | 1 |

TABLE 3-continued

|   |   |   |   | SUM | NORMALISED VALUES |
|---|---|---|---|---|---|
| 242.578 | 122.568 | 182.488 | 228.795 | 776.429 | 0.894423 |
| 64.831 | 122.568 | 182.488 | 228.795 | 598.682 | 0.689664 |
| 64.831 | 122.568 | 182.488 | 19.939 | 389.826 | 0.449068 |
| 64.831 | 122.568 | 3.846 | 19.939 | 211.184 | 0.243278 |
| 64.831 | 0.348 | 3.846 | 19.939 | 88.964 | 0.102484 |
| 0.007 | 0.348 | 3.846 | 19.939 | 24.14 | 0.027809 |
| 0.007 | 0.348 | 3.846 | 0 | 4.201 | 0.004839 |
| 0.007 | 0.348 | 0 | 0 | 0.355 | 0.000409 |
| 0.007 | 0 | 0 | 0 | 0.007 | 8.1 E-06 |
| 0 | 0 | 0 | 0 | 0 | 0 |
| 0 | 0 | 0 |   | 0 | 0 |
| 0 | 0 |   |   | 0 | 0 |
| 0 |   |   |   | 0 | 0 | spectral lines and take account of this in the subsequent analysis of the sample.

Using the tilted slit image and subsequent reconstruction procedure of the present invention it has been demonstrated that:

1. Non-uniformity of slit image illumination can be accounted for by simple polynomial interpolation and summation suggests that linear interpolation will be sufficient;
2. The reconstructed peak shapes are of sufficient quality for output to a user;
3. The measured analyte signal is independent of wavelength calibration provided that summation of the line line-profile over the equivalent of a pixel is performed; and,
4. The position of the peak centre is accurate to within ±0.1 pixels with linear interpolation.

We claim:

1. In a spectrophotometer having an entrance slit, means providing spectral dispersion and a charge coupled device array as an image receiver, said charge coupled device array having a plurality of pixels arranged at a predetermined pitch in columns and rows with each of said pixels having an output, and wherein the height of an image of said entrance slit on said charged coupled device array, is arranged to extend over two or more rows of said pixels of said charge coupled device array, said spectrophotometer also having means to analyze said outputs of said pixels of said charge coupled device array to provide information on spectral lines, the improvement wherein said image of said entrance slit is tilted with respect to said columns of said pixels in said charge coupled device array whereby said image of said entrance slit is skewed over pixels in two adjacent columns and wherein said means to analyze said outputs of said pixels provides information on the intensity distribution of each said spectral line with respect to wavelength having a resolution greater than that of said pitch of said pixels in each said row of said charge coupled device array.

2. A spectrophotometer according to claim 1, wherein said means which providing spectral dispersion provide dispersion in two mutually perpendicular directions whereby spectral lines of each spectral order are dispersed in a first direction and said spectral orders are dispersed in a second direction perpendicular to said first direction.

3. A spectrophotometer according to claim 2, wherein said columns and rows of said charge coupled device array are arranged mutually perpendicular and said image of said entrance slit is tilted with respect to said columns of said charge coupled device array whereby said rows of said pixels on said charge coupled device array are generally aligned with said first dispersion direction and said columns of said pixels are generally aligned with said second perpendicular direction.

4. A spectrophotometer according to claim 3, wherein said means which provide spectral dispersion comprises a grating to disperse each said spectral order in said first direction corresponding to said row direction of said charge coupled device array and an echelle polychromator to provide dispersion of said different orders in said second perpendicular direction corresponding to said column direction of said charge coupled device array.

5. A spectrophotometer according to claim 1, wherein said image of said entrance slit is spread over between four and five rows of pixels.

6. A spectrophotometer according to claim 1, wherein said image of said entrance slit has a predetermined width which is matched substantially to said predetermined pitch of said pixels in said rows.

7. A spectrophotometer according to claim 1, wherein said image of said entrance slit has a top and a bottom and said image is tilted to an extent whereby there is substantially only one pixel pitch difference in said first direction between said top and said bottom of said image on said charge coupled device array.

8. A spectrophotometer according to claim 1, wherein said means to analyze said pixel outputs comprises processing means programmed with a reconstruction algorithm which is applied to each said pixel output to obtain intensity profile information for individual spectral lines with respect to wavelength.

9. A spectrophotometer according to claim 8, wherein said processing means includes means to monitor said output of each said pixel in each said row to obtain coarse resolution intensity distribution information with respect to wavelength, means to interpolate said coarse intensity distribution information, means to translate said information to compensate for said tilt of said image of said entrance slit, and means to sum said translated interpolated information at a number of sampling points having a greater resolution than that of said pitch of said pixels in said rows.

10. A spectrophotometer according to claim 9, wherein said interpolation is a zeroth order interpolation and a constant value output by each said pixel is used at all sampling positions throughout said pitch of each said pixel.

11. A spectrophotometer according to claim 9, wherein a first or higher order interpolation is carried out on said value output from each said pixel.

12. A spectrophotometer according to claim 8, said processing means having:

means to store an output intensity value of each said pixel in each said column of said charge coupled device array in the form of a data table having rows and columns of data points;

means to expand the number of said data points in said data table by repeating each said consecutive charge coupled device array output value stored within a column of said table c.m/n times where m is the height of said entrance slit image in terms of the number of rows of said pixels it extends over, n is said tilt of said entrance slit image in terms of the number of columns of said pixels it extends over, and c is a positive real number;

means to displace each said column of said data table one data point relative to an adjacent column to compensate for said image tilt;

means to sum each said values in each row of said data table;

and, means to normalise each said summed value to provide an output.

\* \* \* \* \*